United States Patent
Reynhout et al.

(10) Patent No.: US 7,811,967 B2
(45) Date of Patent: Oct. 12, 2010

(54) METHOD OF PREPARING CATALYST SUPPORT FROM A WASTE CATALYST

(75) Inventors: Marinus Johannes Reynhout, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 96 days.

(21) Appl. No.: 11/793,461

(22) PCT Filed: Dec. 21, 2005

(86) PCT No.: PCT/EP2005/057007

§ 371 (c)(1),
(2), (4) Date: Mar. 31, 2008

(87) PCT Pub. No.: WO2006/067169

PCT Pub. Date: Jun. 29, 2006

(65) Prior Publication Data

US 2008/0306172 A1 Dec. 11, 2008

(30) Foreign Application Priority Data

Dec. 23, 2004 (EP) .................................. 04106937

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ............................ 502/327; 502/20; 502/22; 502/56; 502/240; 502/326; 502/332; 502/333; 502/334; 502/335; 502/337; 502/338; 502/339; 502/349; 502/350; 502/355; 502/415; 502/439

(58) Field of Classification Search .................. 502/20, 502/22, 56, 240, 326, 327, 332, 333, 334, 502/335, 336, 337, 338, 339, 349, 350, 355, 502/415, 439
See application file for complete search history.

(56) References Cited

U.S. PATENT DOCUMENTS

| 2,369,956 | A | | 2/1945 | Felsst et al. ............... 260/449.6 |
| 3,804,647 | A | * | 4/1974 | Elmer et al. ................... 501/39 |
| 3,928,236 | A | * | 12/1975 | Rigge et al. .................. 502/439 |
| 5,250,483 | A | * | 10/1993 | Sperl et al. ...................... 502/7 |
| 5,559,066 | A | | 9/1996 | Poepel et al. .................. 502/20 |
| 5,928,980 | A | * | 7/1999 | Gangwal et al. .............. 502/20 |
| 6,030,915 | A | * | 2/2000 | de Boer ........................ 502/39 |
| 6,127,299 | A | * | 10/2000 | de Boer et al. ................ 502/56 |
| 6,130,183 | A | * | 10/2000 | Herskowitz et al. ......... 502/349 |
| 6,331,574 | B1 | * | 12/2001 | Lapidus et al. .............. 518/709 |
| 6,989,345 | B2 | * | 1/2006 | Lansink Rotgerink et al. .......................... 502/240 |
| 7,001,866 | B2 | * | 2/2006 | Wang et al. .................. 502/242 |
| 7,419,928 | B2 | * | 9/2008 | Malek et al. ................... 502/20 |
| 2003/0144141 | A1 | * | 7/2003 | Bowman et al. ............ 502/302 |
| 2006/0128565 | A1 | * | 6/2006 | Flytzani-Stephanopoulos et al. .......................... 502/439 |

FOREIGN PATENT DOCUMENTS

| CN | 1052263 | 6/1991 |
| DE | 271997 | 9/1989 |
| DE | 4419974 | 3/1996 |
| EP | 452630 | 10/1991 |
| WO | WO2004028687 | 4/2004 |

OTHER PUBLICATIONS

International Search Report dated Mar. 30, 2006.

* cited by examiner

*Primary Examiner*—Cam N Nguyen

(57) ABSTRACT

A method of preparing, preferably recycling, a catalyst support material is disclosed and is particularly applicable to recycling a titania support. The invention includes crushing the used catalyst support that is obtained by leaching catalytic components from a used supported catalyst and preferably combining it with new catalyst support in order to provide the required average particle size and ratio of crystal phases. The invention has a number of benefits including making use of used catalyst support materials which have been conventionally disposed of and also providing a method to more efficiently recycle the active component. Where the support is recycled for a similar application, less promoter may be required.

11 Claims, No Drawings

METHOD OF PREPARING CATALYST SUPPORT FROM A WASTE CATALYST

The present application claims priority to European Patent Application 04106937.8 filed 23 Dec. 2004.

FIELD OF THE INVENTION

This invention relates to a method of preparing, particularly but not exclusively, recycling or re-using catalyst support material such as that used in a Fischer-Tropsch process. Preferably the support material of spent Fischer-Tropsch catalyst is used for the preparation of new Fischer-Tropsch catalyst.

BACKGROUND OF THE INVENTION

The Fischer-Tropsch process can be used for the conversion of hydrocarbonaceous feed stocks into liquid and/or solid hydrocarbons. The feed stock (e.g. natural gas, associated gas and/or coal-bed methane, biomass, residual oil fractions and coal) is converted in a first step into a mixture of hydrogen and carbon monoxide (this mixture is often referred to as synthesis gas or syngas). The synthesis gas is then fed into a reactor where it is converted over a suitable catalyst at elevated temperature and pressure into paraffinic compounds ranging from methane to high molecular weight modules comprising up to 200 carbon atoms, or, under particular circumstances, even more.

Catalysts typically comprise an active portion, such as a metal or metal component, supported on a carrier material, which can be a porous refractory oxide such as titania, silica or alumina. Catalysts deactivate over time, and are therefore replaced periodically in order to maintain a reasonable product yield.

For example, a supported cobalt catalyst is currently used as a catalyst for the Fischer-Tropsch reaction as well as for certain other applications. The catalyst can be poisoned by a number of different species including, for example, sulfur, sodium, nitrogen or carbon containing compounds; all of which de-activate the catalyst. Furthermore the dispersion of the metal or metal component may decrease.

Also, sintering and agglomeration of the support particles reduces the surface area of the support and consequently the activity of the catalyst.

When the economics dictate that the cost of shutting down the reactor and replacing the catalyst is less than the lost revenue due to deactivation of the catalyst, the reactor is shut down and the catalyst replaced. The de-activated catalyst can be treated by, for example, nitric acid to leach out some or, preferably, all of the relatively expensive cobalt which can be recovered and re-used. However, the support is conventionally just disposed of in land-fill sites.

SUMMARY OF THE INVENTION

According to the present invention, there is provided a method of preparing a catalyst support material, the method comprising:

obtaining a used catalyst support material by leaching catalytic components from a used supported catalyst, and crushing said catalyst support material, such that some or all of the crushed material is reusable as a catalyst support material.

Thus, the used catalyst support material can be re-used, whereas conventionally it was disposed of in land-fill sites.

DETAILED DESCRIPTION OF THE INVENTION

Therefore the invention provides a method of re-using a catalyst support material, the method comprising:

obtaining a used catalyst support material, and crushing said catalyst support material by leaching catalytic components from a used supported catalyst, such that some or all of the crushed material is reusable.

The invention also provides a process for the preparation of a catalyst support material, comprising obtaining a used catalyst support material and crushing said catalyst support material.

Preferably the used catalyst support material is a crystalline catalyst support material, suitably crystalline porous refractory oxides.

More preferably the catalyst support material is a highly-crystalline catalyst support material.

Suitable catalyst support materials include refractory oxides, especially porous refractory oxides such as silica, titania (rutile and anatase), zirconia, α-quartz, alumina for example α-alumina, γ-alumina, θ-alumina, aluminium silicates ($Al_2SiO_4$), silica/alumina (e.g. ASA), and mixtures thereof. $CoTiO_3$, $CoSiO_3$, $MnTiO_3$, $CoAl_2O_4$, $MnAl_2O_4$ or mixtures thereof are also suitable—these can be formed during the life of a catalyst and are suitable as catalyst support materials. Preferably the catalyst support material comprises at least 90 wt % of the support material of one support material only, more preferably at least 95 wt %, more preferably 98 wt %. In the case of mixtures there may occur some separation of the phases resulting in less homogeneous material.

Preferably the method of the present invention further provides the step of treating some or all of the used catalyst to remove a portion of its active component(s). A suitable method is the acid or basic leaching process in which the used catalyst is contacted with an acid or basic solution in which the active component dissolves. Inorganic acids, e.g. hydrochloric acid, nitric acid, but also sulphuric acid, phosphoric acid, as well as organic acids, e.g. formic acid, acetic acid, oxalic acid, benzoic acid etc., may be used. Suitable bases are sodium hydroxide, potassium hydroxide and calcium hydroxide. Nitric acid (or, for example, a mixture of nitric acid and hydrochloric acid) may very suitably be used to remove certain active components, especially iron, cobalt and nickel. This can also remove contaminants such as sodium, nitrogen and sulphur, which can be present in used catalyst.

Analysis was performed on a sample of titania after leaching. The titania sample had previously been used as a catalyst support material along with cobalt as the active component and manganese as promoter. It was found to contain 0.1 wt % cobalt and 0.1 wt % manganese and an average crystal size of 40-50 nm.

At least 50 wt % of the active component can be removed, preferably at least 80 wt % is removed, more preferably at least 90 wt % is removed. The active component is especially cobalt.

Preferably the used catalyst material is crushed before removing its active component, more preferably partially crushed in order to aid removal of its active component. This partial or pre-crush preferably reduces the particle size to between 10 and 15 μm.

Optionally the used catalyst is calcined in order to remove certain deactivating species, such as sulphur and/or carbon containing compounds. This is typically carried out after a portion of the active component has been removed. This is typically done after the initial crushing step. Calcination is usually done in air at temperatures between 200 and 800° C., especially 300 and 650° C., for a period between 0.5 and 18 hours The used catalyst support material is preferably crushed to yield a required average particle size. This is preferably done after calcination. Preferably the average particle size after crushing is less than 1 μm.

The crushing could be adapted to generally break up agglomerated particles to single particles rather than break up individual particles since it requires a disproportionately higher amount of energy to break a single particle than it does to break an agglomeration of single particles.

Preferably the method of the present invention further includes the step of admixing the crushed used catalyst support material with new catalyst support material prior to re-use.

The term 'new catalyst support material' as used herein includes catalyst support materials which are fresh, are unused, have not been used as a catalyst support material before.

Typically the crushed used catalyst support material has an average particle size of 1000 nm which is formed from agglomerated primary particles of around 40-50 nm. Preferably the new catalyst support material has an average primary particle size of 30 nm so as to obtain combined (used and new) catalyst support material with an average crystal size of a third, target size, for example around 35 nm.

Primary particles are those visible in transmission electron microscopy (TEM) or the average primary particle size calculated from surface area.

For crystalline materials, the primary particles are crystals.

Preferably at least 5% of the combined catalyst is used catalyst, more preferably at least 10% of the combined catalyst is used catalyst. In certain embodiments the new and used catalyst support material is admixed in a 1:1 ratio.

Typically the used catalyst support material is to be re-used preferably as a catalyst support material.

The re-used catalyst support material may be combined with an active component by pre-mixing and extrusion, spray-drying, impregnation or any other conventional technique.

Preferably the content of the active component which remains on the used catalyst support material (or that part of the active component after some has been removed) is determined before further active component is added to the combined catalyst support material before re-use. Typical active components are cobalt, iron, or ruthenium or combinations thereof.

Similarly, it is preferable for the residual content of any promoter on the used catalyst support material to be determined before further promoter is added to the combined catalyst support material. Typical promoters include manganese, ruthenium, platinum, rhenium, zirconium, vanadium etc. In practice about 80 wt % of promoter (metal weight only) may be left as residual content on the catalyst support material. Preferably at least 40 wt % of original promoter (metal weight only) is left on the carrier, preferably 60 wt %, more preferably 80 wt %. It is to be understood that the catalytic components relate to the catalytically active metal components (e.g. cobalt, iron, nickel etc.) and do not comprise the promoter compounds (e.g. rhenium, platinum, manganese, vanadium etc).

The ratio of the crystalline forms of the support material, for example titania, may also be balanced by determining the content of the crystalline forms in the used catalyst and allowing for this when combining with new catalyst. For example, when reusing titania, the target proportion of anatase:rutile may be 80%:20%. If the amount of anatase in the used catalyst support material is lower, for example 70%, and the amount of rutile is higher, for example 30%; then it can be admixed with new titania being proportionally higher in anatase, for example 90%, and lower in rutile, for example 10%. This brings the total anatase/rutile content of the combined used and new titania to the exemplary target ratio of 80% anatase and 20% rutile.

The proportion of the titania crystal form brookite may also be replenished in this way. Some catalyst support materials may have 70% brookite and 30% rutile for example. Also, it is not necessary to mix the used catalyst support material with new catalyst support material to obtain the same proportion of material or crystal phase used previously as other proportions or mixtures can be used. For example new brookite may be added to a used catalyst support material which was previously formed substantially from anatase and rutile with no brookite.

Also, when recycling alumina, the ratio of the crystalline forms of alumina (alpha, gamma and theta) may also be adjusted by appropriate selection of the proportion of the different crystalline forms in the new catalyst material in order to arrive at a target ratio of the various crystalline forms for the combined catalyst material.

A further benefit of certain embodiments of the invention results in the proportion of new rutile and anatase required to achieve the target ratio when mixed with used titania: the said new proportion is easier to produce industrially than the target ratio and so re-using the used titania and mixing it with new titania can allow a less expensive new titania to be used.

Embodiments of the present invention benefit in that less promoter and/or active component is required since the used catalyst material can have a residual content of this material. This is especially true for manganese which is used in catalysts, especially in combination with cobalt. It appears that on porous refractory oxides, especially titania, this manganese containing layer is formed on the surface. This means that when re-using the used catalyst support, a considerably smaller amount of promoter can be used, because none, or only a small part of the manganese promoter leaks away to the carrier.

Embodiments of the invention benefit in that the recycled catalyst support material tends not to absorb a portion of the newly added active component but rather the active component remains on its surface, which aids the reaction it is catalysing. This is because the recycled catalyst support material will still have a residual amount of active component absorbed thereon, even if the main part of the original active component has been removed, for example by leaching.

Therefore, a reduced amount of active component may be required when the catalyst support material is re-used.

Embodiments of the invention benefit in that the combined used and new catalyst support material can have a proportion of particles which are greater in size than the new support material. The combination of different sized particles adds strength to the catalyst. For example, when re-using titania, the used rutile particles will have a greater size than the new rutile particles resulting in a combined new and used support with greater strength than a purely new support manufactured in a conventional manner.

It is also been found for embodiments of the present invention that the carrier support material ages less when a recycled material is used.

The conventional process to remove the active component from the support material is severe due to the high cost of the active component. In certain embodiments of the present invention, the process to remove the active component may be less severe and thus significantly less expensive since the active component may remain on the catalyst support material and be re-used in this way.

A further advantage of such an embodiment of the present invention is that the trace impurities typically found in new catalyst support materials, for example $TiOCl_2$ is an impurity in certain types of titania, is much lower in the recycled material since it comes out of the titania as HCl during its prior use. This impurity reduces catalyst activity, can harm equipment and can combine with hydrocarbons to produce unwanted chloro-hydrocarbon impurities and so it is preferably minimised.

Thus embodiments of the present invention benefit in that they have less of such an impurity to be removed.

The recycled material may be re-used and thereafter recycled a number of times.

Thus the invention also provides for the use of a catalyst support prepared, at least in part, by crushing a used catalyst support material.

In a preferred embodiment the used catalyst support is silica, titania or alumina, preferably titania or alumina and the metal component is an iron or cobalt component, preferably a cobalt component, while further a second metal component is present chosen from rhenium, platinum, zirconium, vanadium or manganese, preferably manganese.

In a further preferred embodiment the used catalyst support material is obtained by leaching at least 50 wt % of the metal components from a used catalyst, preferably 80 wt % of the metal components, more preferably 90 wt %, the metal components especially being Group VIII metal components, more especially iron, cobalt or nickel components, still more especially cobalt components.

The invention also provides a catalyst support material whenever prepared by a method according to the first aspect of the invention.

The invention further provides a catalyst comprising a catalyst support material whenever prepared by a method according to the first aspect of the invention and a catalytically active material.

Indeed the material re-used to from a new catalyst support material need not come from a used catalyst but may come from other used materials such as those used in nanotechnology, solar cells, medical applications etc.

Thus the invention also provides a method of making a catalyst comprising:
obtaining a used crystalline material;
adding an active component to said crystalline material to form a catalyst, especially including the specific and preferred embodiments as described above.

Typically the used crystalline material is crushed before adding the active component.

Typically other steps may also be performed on the used crystalline material such as the steps carried out on the used catalyst support material.

The present invention is particularly suitable for use in recycling titania whenever or wherever used, as a catalyst support or otherwise, more particularly titania used in a Fischer-Tropsch reactors, especially according to the specific and preferred embodiments as described above.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_5+$ hydrocarbons is at least 60% by weight of the total product, more preferably, at least 70% by weight, even more preferably, at least 80% by weight, most preferably at least 85% by weight. Reaction products which are liquid phase under reaction conditions may be separated and removed using suitable means, such as one or more filters. Internal or external filters, or a combination of both, may be employed. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier.

The catalyst carrier is preferably porous, such as a porous inorganic refractory oxide, more preferably alumina, silica, titania, zirconia or mixtures thereof. The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter. Especially the catalyst in an extruded catalyst suitable for use in multi tubular fixed bed reactors.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+ vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ration is in the range from 1.0 to 2.5.

The gaseous hourly space velocity may very within wide ranges and is typically in the range from 1500 to 10000 Nl/l/h, preferably in the range from 2500 to 7500 Nl/l/h.

It will be understood that the skilled person is capable to select the most appropriate conditions for a specific reactor configuration and reaction regime. It will be appreciated that the preferred conditions may depend on the preferred mode of operation.

Improvements and modifications may be made without departing from the scope of this invention.

The invention further comprises a process for the preparation of hydrocarbons from synthesis gas using the recycled carrier material as described hereinbefore as carrier material for the preparation of the Fischer-Tropsch catalysts as described hereinbefore. The invention also concerns the hydrocarbons made in this process, optionally after hydroconversion. These products include naphtha, kerosine, gasoil and base oils.

EXAMPLE

A spent Fisher-Tropsch catalyst (cobalt-manganes-titania (P25) extrudetes) was leached (after crushing) using nitric acid in order to remove the cobalt content of the catalyst. The obtained support material contained about 0.1 wt % cobalt and 0.1 wt % manganes (based on total support). After some further crushing the average crystal size was about 45 mm. This support was used for the preparation of a new catalyst having the same composition as the original (new) catalyst. After activation the catalyst showed about the same activity in the Fischer-Tropsch process as the original (new) catalyst. Thus, the recycled titania support can replace new (i.e. not been used before) titania support.

We claim:

1. A method of preparing a catalyst support material, the method comprising:
   obtaining a used catalyst support material by leaching at least 50 wt % of the catalytic components from a used supported catalyst,
   crushing said catalyst support material, such that some or all of the crushed material is reusable as a catalyst support material, and
   admixing some or all of the crushed material with new catalyst support material.

2. A method as claimed in claim 1, wherein the used catalyst support material is a crystalline catalyst support material.

3. A method as claimed in claim 1, wherein the used catalyst support material is a refractory oxide material selected from the group consisting of titania, zirconia, α-alumina and γ-alumina.

4. A method as claimed in claim 1, wherein the used catalyst support material comprises a first ratio of anatase:rutile titania, the new catalyst support material has a second ratio of anatase:rutile titania, and the combined catalyst support material has a third target ratio of anatase:rutile titania.

5. A method as claimed in claim 1, wherein the used catalyst support material is calcined.

6. A method as claimed in claim 1, wherein the used catalyst support material is obtained by leaching at least 80 wt % of the catalytic components from the used supported catalyst.

7. A method as claimed in claim 1, wherein the used catalyst support is selected from the group consisting of silica, titania and alumina, and the catalytic component is an iron or cobalt component.

8. A method as claimed in claim 1, further comprising determining the amount of active catalyst component remaining on the used catalyst support prior to combining with new catalyst support material.

9. A method as claimed in claim 1, wherein the used catalyst support material is obtained by leaching at least 90% of the catalytic components from the used supported catalyst.

10. A method as claimed in claim 1, wherein the catalytic components include a Group VIII metal component.

11. A method as claimed in claim 10, wherein the Group VIII metal component is selected from the group consisting of iron, cobalt and nickel.

* * * * *